United States Patent [19]
Nilsson

[11] Patent Number: 5,060,353
[45] Date of Patent: Oct. 29, 1991

[54] CONTROL DEVICE FOR SETTING TWO OR MORE TOOL UNITS IN A MACHINE, ESPECIALLY A VENETIAN BLIND PRODUCTION MACHINE

[76] Inventor: Berndt R. Nilsson, Adolf Fredriksgatan 6, S-217 74 Malmö, Sweden

[21] Appl. No.: 483,313

[22] Filed: Feb. 21, 1990

Related U.S. Application Data

[63] Continuation of Ser. No. 315,799, Feb. 27, 1989, abandoned.

[30] Foreign Application Priority Data

Feb. 29, 1988 [SE] Sweden ............................... 8800704

[51] Int. Cl.[5] ............................................. B23P 19/04
[52] U.S. Cl. ............................................. 29/24.5
[58] Field of Search ................... 29/24.5, 564.8, 33 K, 29/33 Q, 56.6; 425/384

[56] References Cited

U.S. PATENT DOCUMENTS

| | | | |
|---|---|---|---|
| 4,386,454 | 6/1983 | Hopper | 29/564.8 X |
| 4,615,087 | 10/1986 | Chang | 29/24.5 |
| 4,665,599 | 5/1987 | Nilsson | 29/24.5 |
| 4,711,005 | 12/1987 | Chang | 29/24.5 |
| 4,823,449 | 4/1989 | Chang | 29/24.5 |

FOREIGN PATENT DOCUMENTS

| | | | |
|---|---|---|---|
| 0182805 | 6/1988 | European Pat. Off. | 29/24.5 |
| 713802 | 8/1954 | United Kingdom | 29/24.5 |

*Primary Examiner*—Timothy V. Eley
*Assistant Examiner*—Peter Dungba Vo
*Attorney, Agent, or Firm*—Shapiro and Shapiro

[57] ABSTRACT

A control device for adjusting two or more tool units (3) in a machine, especially a Venetian blind production machine, comprises a number of series-connected setting screws (10-14) and gear units (15-19) for proportionally displacing the tool units along the machine bed (2) when operated by means of a drive motor (21).

15 Claims, 6 Drawing Sheets

CONTROL DEVICE FOR SETTING TWO OR MORE TOOL UNITS IN A MACHINE, ESPECIALLY A VENETIAN BLIND PRODUCTION MACHINE

This is a continuation of application Ser. No. 315,799 filed Feb. 27, 1989, now abandoned.

BACKGROUND OF THE INVENTION

On many machines, especially Venetian blind production machines, a number of tool units must be set in different positions along a machine bed. In some cases, it is advantageous that these tool units be movable relative to one another along the machine bed, such that they can be placed in optionally selectable and yet relatively proportional positions along the machine bed. One instance of this requirement is the Venetian blind production machine which constitutes the subject matter of the European Patent EP-B-0,182,805 (see also corresponding U.S. Pat. No. 4,665,599). This machine comprises a feeding device for supplying from a supply reel at least one metal strip intermittently in the longitudinal direction of the metal strip through a number of ladder tapes, and a punching station with means for punching lift-cord holes in the free end portion of the metal strip before this end portion is inserted in the ladder tapes. The machine also includes a separating station for separating from the free end portion of the metal strip the individual Venetian blind slats inserted in the ladder tapes. The punching station of this Venetian blind production machine has at least two groups of punching tools for simultaneously punching lift cord holes in at least two successive Venetian blind slats, and the separating station has at least a corresponding number of separating punches for simultaneously separating Venetian blind slats for the same number of simultaneously produced Venetian blinds. For readjustment of such a Venetian blind production machine for different slat lengths, the different tools must be set in exact positions along the machine bed. This operation is time-consuming, and errors are easily made. If the punching of lift-cord holes takes place in a machine section ahead of the threading tools, the setting operation will be far more complicated and even more time-consuming.

SUMMARY OF THE INVENTION

The present invention aims at providing a control device by which two or more tool units in a machine, especially a Venetian blind production machine, can be set in different optionally selectable and relatively proportional positions along a machine bed.

Briefly stated, the control device according to the invention comprises a number of series-connected setting screws and gear units for proportional displacement of the tool units along the machine bed during operation by means of a drive motor.

Especially preferred embodiments of the invention are presented herein.

BRIEF DESCRIPTION OF THE DRAWINGS

The invention will be described in more detail hereinafter, reference being had to the accompanying drawings illustrating two embodiments of a device according to the invention. In the drawings.

DETAILED DESCRIPTION OF THE INVENTION

Figure 1:
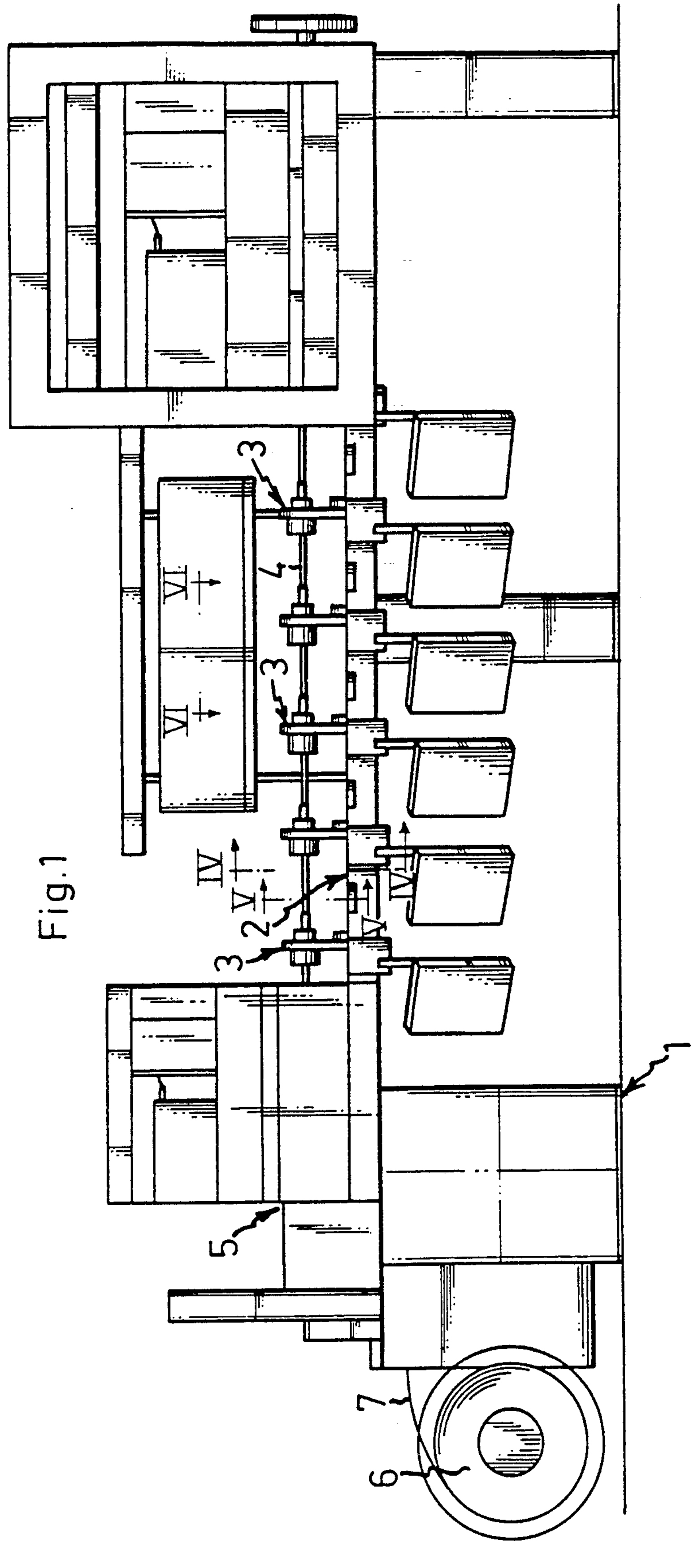
FIG. 1 is a schematic lateral view of a Venetian blind production machine incorporating a control device according to the present invention.

FIG. 1 shows the device according to the invention, as applied to a Venetian blind production machine. The machine comprises a frame 1 having an elongated machine bed 2 along which a number of tool units 3 can be clamped in desired positions paying regard to the particular Venetian blind construction concerned. The different tool units are interconnected by a main shaft 4 which is driven by a motor (not shown) accommodated in a housing 5. At the infeed end of the machine, a supply reel 6 is mounted for supplying a metal strip 7 which is fed in the longitudinal direction of the machine in a manner explained in detail in the above-mentioned European patent EP-B-0,182,805 which is incorporated herein by reference. For particulars in this respect, reference is therefore made to that publication.

Figure 2:
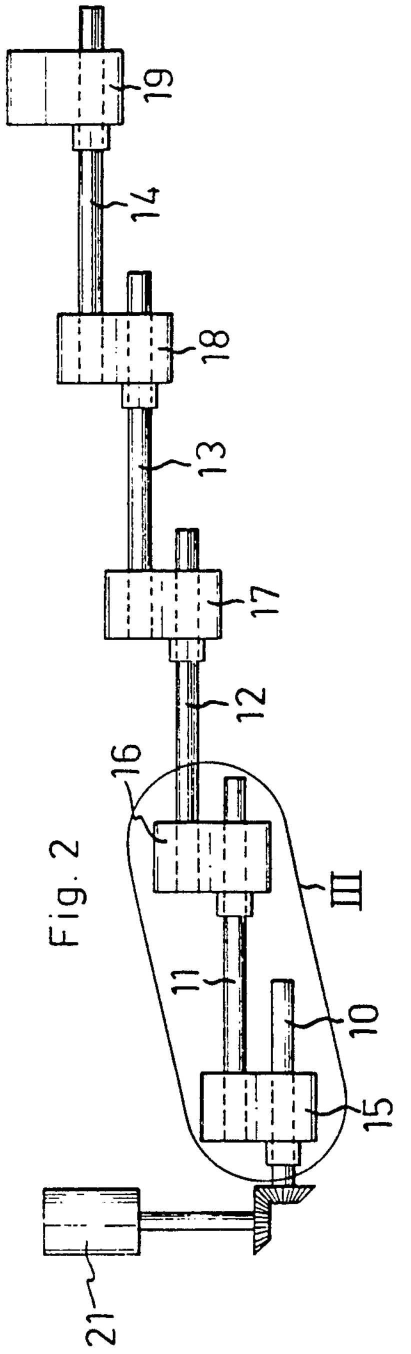
FIG. 2 is a top plan view of parts of the control device.
Figure 3:
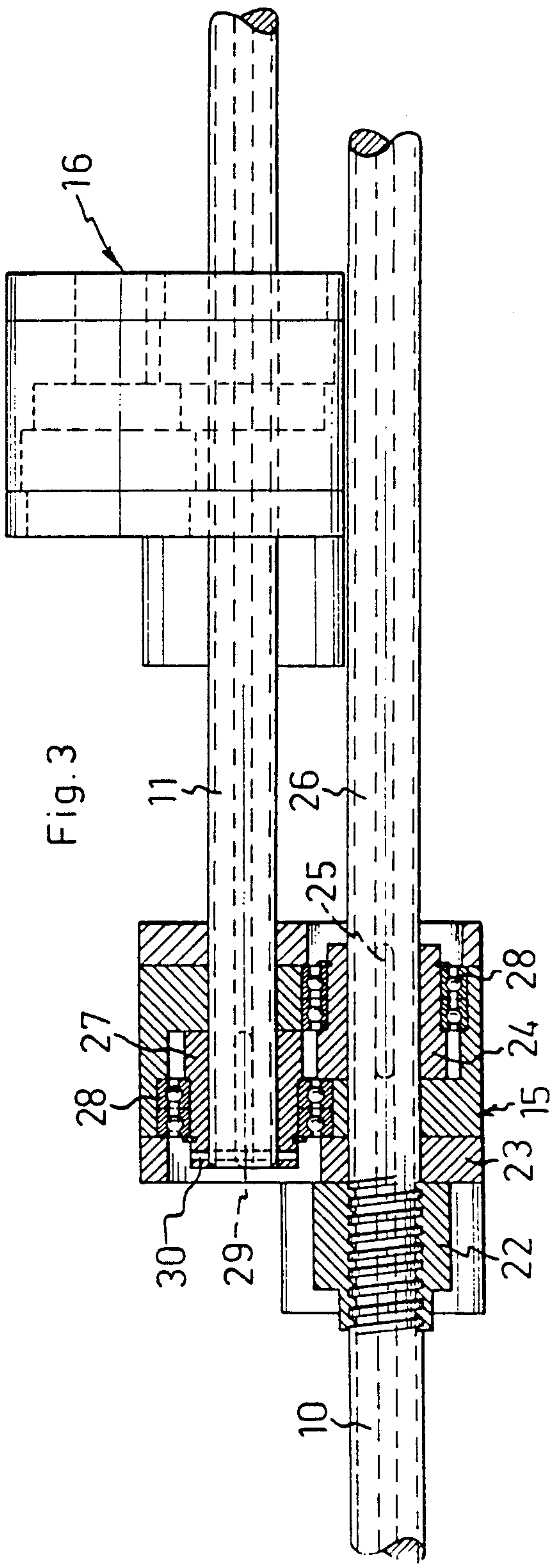
FIG. 3 illustrates, on a larger scale, the area III in FIG. 2.

In use of such a Venetian blind production machine, it is commonly necessary to adjust the positions of tool units 3 proportionally relative to one another along the machine bed 2. In prior art machines of this type, the different tool units were individually displaceable and clampable against the machine bed in desired positions along the bed. Adjustment was therefore time-consuming. The present invention, however, provides a device whereby the tool units may be adjusted automatically and simultaneously. Referring to FIGS. 2 and 3, a first illustrative embodiment of the invention comprises series-connected setting screws 10–14 and corresponding gear units 15–19, the latter being mounted in carriages 20 slidable along the machine bed (see FIGS. 4 and 5). Each setting screw and its corresponding gear unit (e.g., setting screw 10 and gear unit 15, setting screw 11 and gear unit 16, etc.) together constitute a tool unit displacement mechanism.

In the embodiment of FIGS. 2 and 3, a first setting screw 10 is, at its left-hand end as shown in the drawing, connected with a drive motor 21. The screw 10 engages with a nut 22 fixedly connected with the housing 23 of the corresponding gear unit 15. The screw then extends through the hub of a gear wheel 24 of the gear unit 15. The gear wheel 24 is non-rotatably but displaceably connected with the screw 10 by means of a wedge 25 which engages with a longitudinal keyway extending along the entire control length of the screw 10.

The gear wheel 24 is mounted in the housing 23 by means of ball bearings 28 and engages with a second gear wheel 27 which also is mounted in the housing 23 by means of ball bearings 28. The gear wheel 27 is non-rotatably connected, by means of a wedge 29, with the succeeding setting screw 11 which is locked to the gear wheel 27 by means of a pin 30. The gear wheels 24, 27 and the associated mounting components thus provide a means for transmitting rotation of the setting screw 10 to the setting screw 11.

Since the screws 10 and 11 are interconnected by means of two meshing gear wheels, the screws 10 and 11 are oppositely threaded. The gear units 16, 17, 18 and 19 are designed in the same manner as the gear unit 15 and therefore need not be described in detail. It is essential that successive screws are oppositely threaded with the illustrative structure. However, if each gear unit is provided with an additional gear wheel, the successive screws (e.g., screws 10 and 11) may be threaded in the same direction. The preferred gear ratio in the embodiment illustrated is 1:1, but for some applications other gear ratios may be desired for specific tool units or for all tool units. Adapting the gear ratio to existing requirements will be a simple matter for those skilled in the art.

Figure 4:
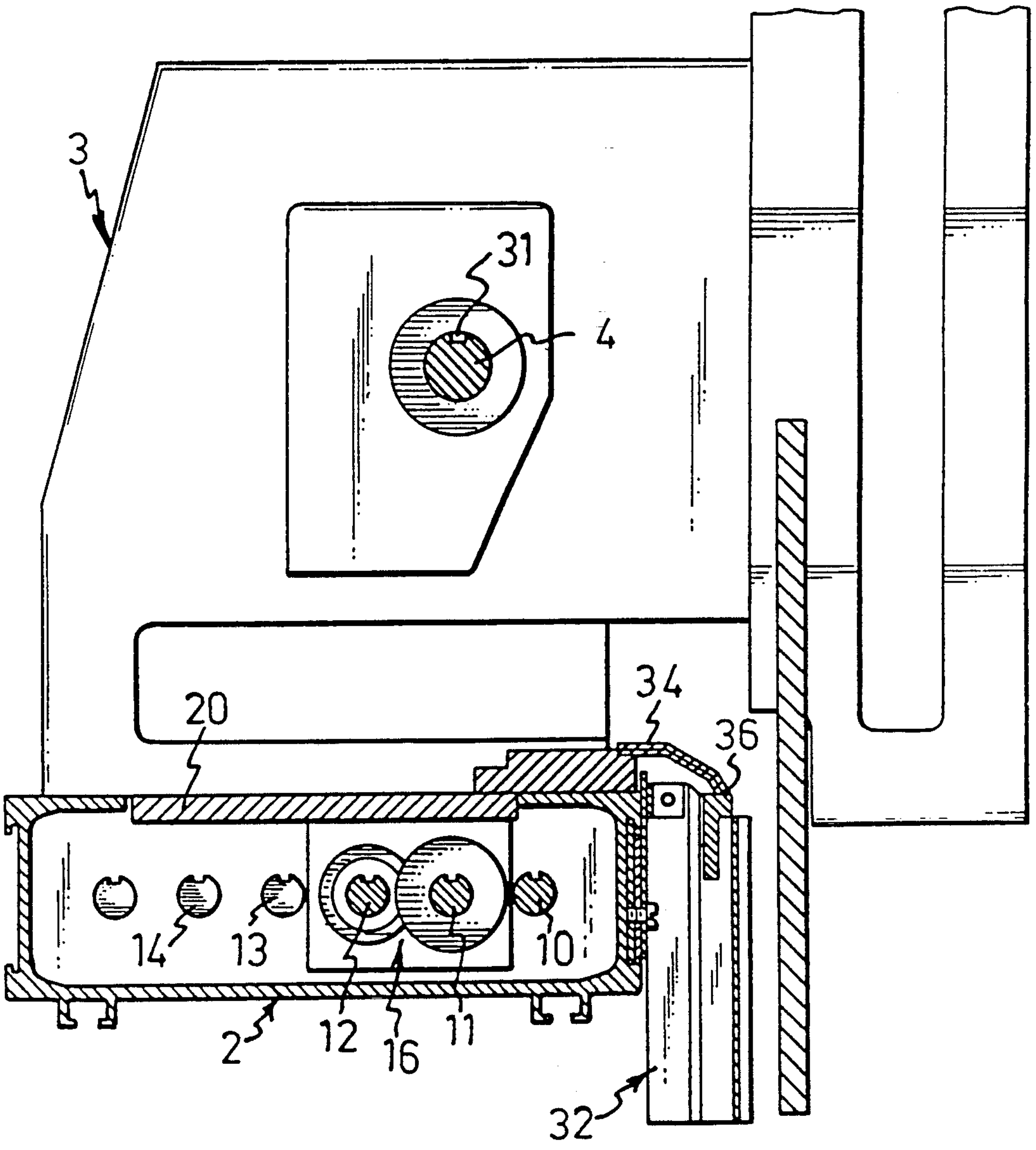
FIG. 4 is a schematic section on line IV—IV in FIG. 1.
Figure 5:
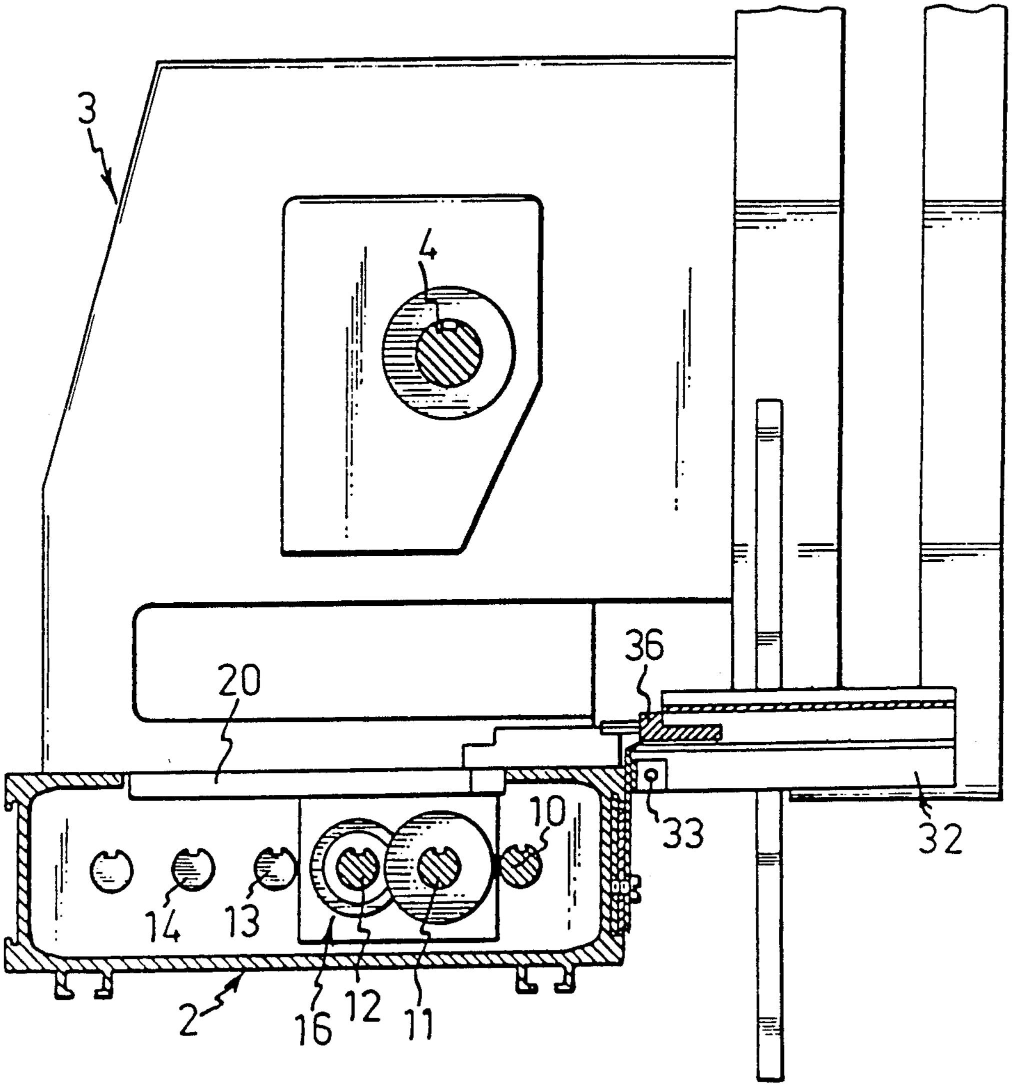
FIG. 5 is a schematic section on line V—V in FIG. 1.
Figure 6:
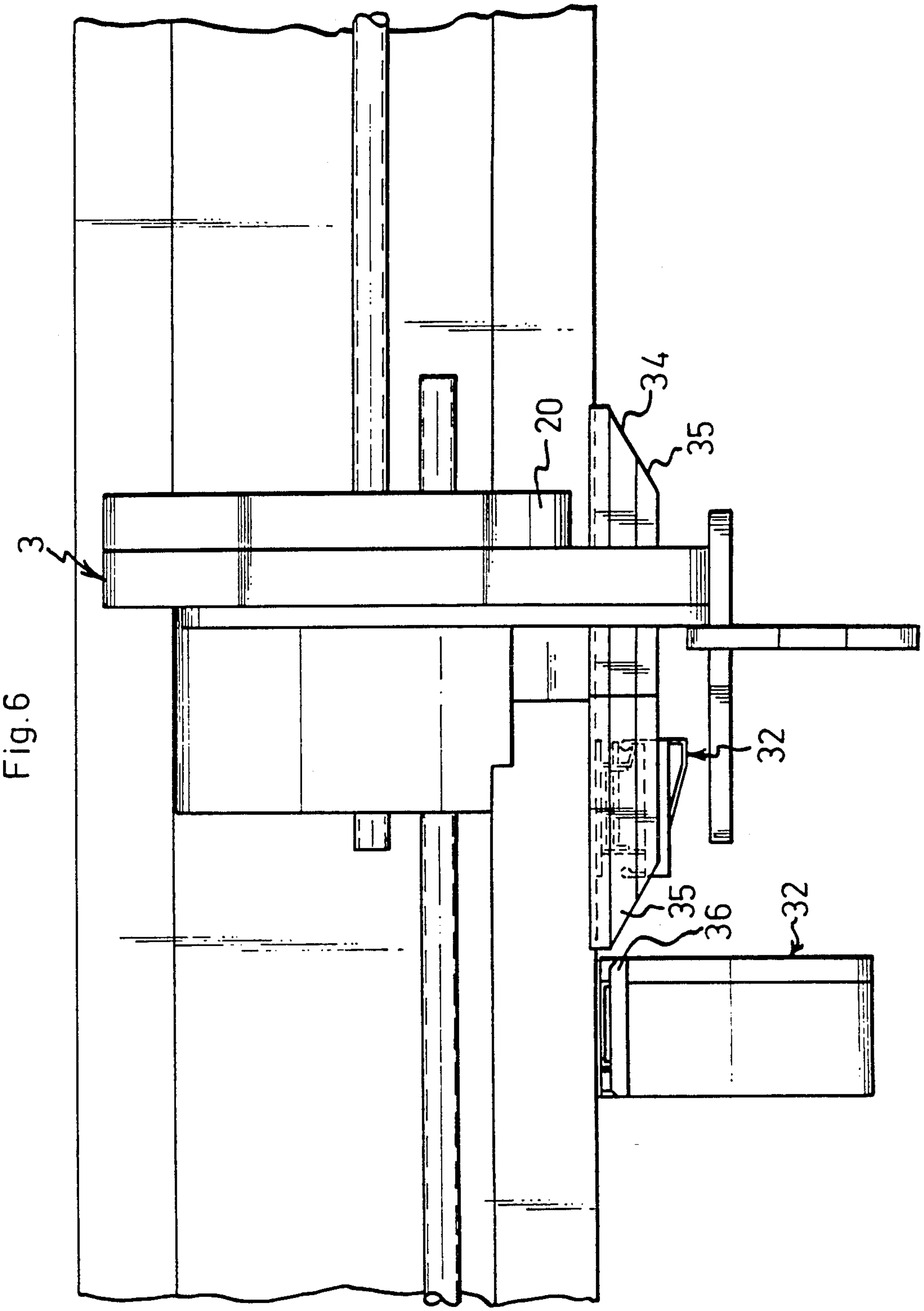
FIG. 6 is a schematic top plan view on line VI—VI in FIG. 1.

As will appear from FIGS. 4 and 5, the carriages 20 and the machine bed 2 are so wide that six screws can be mounted side-by-side with equal center-to-center distances. In the embodiment illustrated, however, only five screws are used.

FIGS. 4 and 5 also show that the main shaft 4 of the machine has a longitudinal keyway 31 engaged by a wedge (not shown) on each tool unit 3 for operating a tool mounted therein.

FIGS. 1 and 4–6 show a number of supports 32 which are mounted along the machine bed 2 and can be automatically folded up and down during movement of the carriages 20 along the machine bed. The supports are pivotally connected with the machine bed by means of a pivot pin 33 and are spring-biased, by means of a spring mechanism (not shown), in counterclockwise direction (FIGS. 4 and 5), which means that they are biased upwardly to the position shown in FIG. 5. FIG. 4 shows one of these supports in folded-down position. When the carriages 20 are moving along the machine bed, the supports are automatically folded down by means of a cam 34 which is mounted on the carriage 20 and formed with an oblique cam surface 35 adapted to engage with a corresponding cam surface 36 on each support 32. In this manner, the supports 32 will be folded up and down during movement of the carriages 20 along the machine bed.

Figure 7:
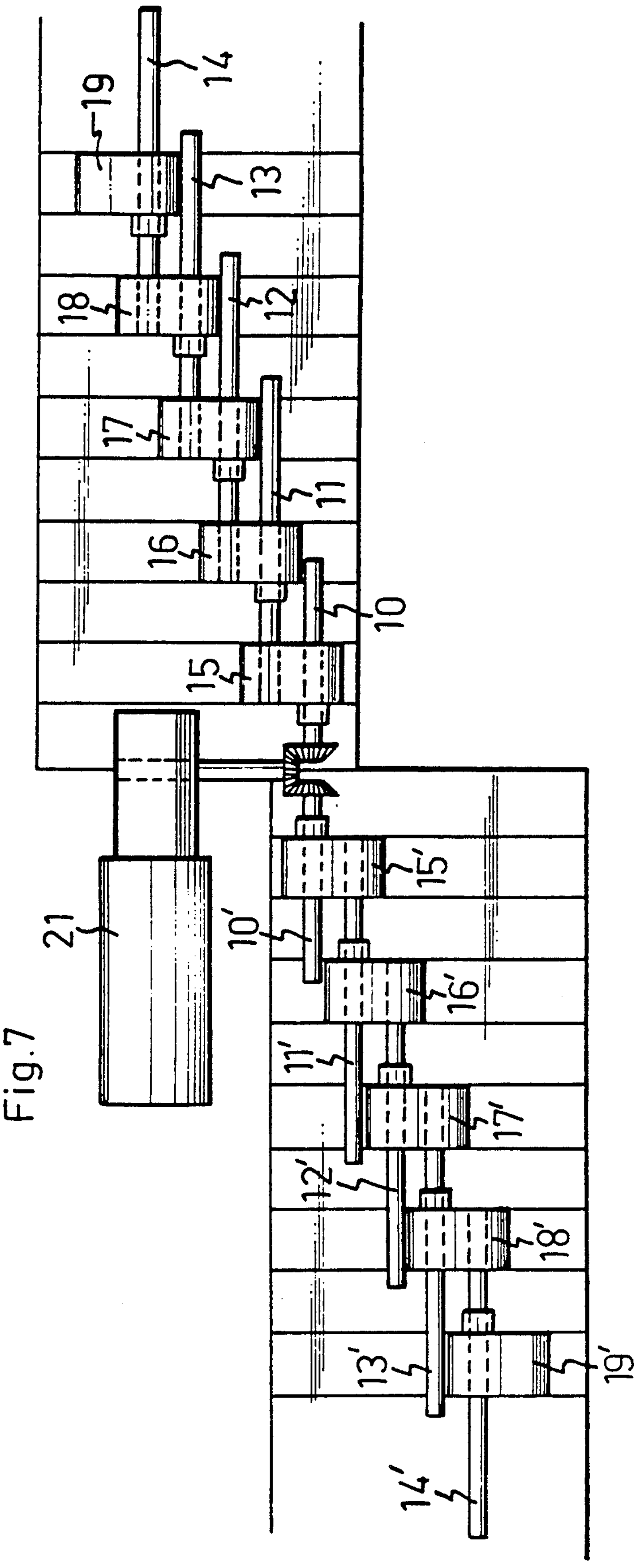
FIG. 7 is a view similar to FIG. 2, showing a further embodiment of the device according to the invention.

FIG. 7 illustrates a further embodiment of the device according to the invention. In this embodiment, the control device is used for two groups of tool units mounted on two sets of gear units 15–19 and 15′–19′ which are operated by a centrally positioned drive motor 21. In other respects, the device may have the same construction as described above in connection with the first-mentioned embodiment.

For adjustment of the different tool units, the drive motor may be a manually operated source of motive power, such as a crank, or some other rotary type power source, such as an electric motor. For automatic operation, use can be made of an electric motor controlled by a computer or the like which may be programmed to store data about different types of products that can be manufactured in the machine.

As has been mentioned above, FIG. 7 shows how the control device according to the invention can be used for two groups of tool units arranged to both sides of a centrally positioned drive unit. A further possibility of using the control device for several sets of tools is to mount the tools side-by-side in each tool unit 3. This embodiment may be advantageous when it is desired in the production of Venetian blinds, for example, to punch and cut mounting rails and the like in the same machine which subsequently is to be used for punching and cutting of blind slats in the manner disclosed in the above-mentioned European patent EP-B-0,182,805. Similarly, each tool unit 3 may also comprise juxtaposed tools for different slat widths, for example 15 mm, 25 mm, 35 mm, 50 mm, etc.

I claim:

1. In a machine having a plurality of tool units arranged in succession along the length of a machine bed, a control device for proportionally adjusting the positions of the tool units along the machine bed length, said control device comprising:

a plurality of tool unit displacement mechanisms arranged in succession along the machine bed length, each displacement mechanism including a gear unit and a corresponding setting screw, each gear unit having means responsive to rotation of the corresponding setting screw for displacing that gear unit along the machine bed length and being connected to an associated tool unit for displacement of that tool unit therewith along the machine bed length, the gear unit of each displacement mechanism prior to the last in succession having means for transmitting rotation of the corresponding setting screw to the setting screw of the next displacement mechanism in succession, said rotation responsive means and said rotation transmitting means being constructed such that the gear units are proportionally displaced along the machine bed length in response to rotation of the setting screws.

2. A control device according to claim 1, wherein said rotation responsive means comprises a nut fixed to a housing of the respective gear unit and threadably engaged with the corresponding setting screw.

3. A control device according to claim 1, further comprising a plurality of supports mounted along the machine bed length and pivotally connected to the machine bed, the supports being upwardly spring-biased and having respective cam surfaces, and wherein said gear units have operating cams disposed to come into engagement with the cam surfaces of the supports support members to cause the support members to drop as the gear units move past the supports along the machine bed length.

4. A control device according to claim 1, having two said pluralities of tool unit displacement mechanisms extending in opposite directions from a common rotary drive means positioned therebetween.

5. A control device according to claim 1, wherein the setting screw of the first displacement mechanism in succession is connected to a rotary drive means for driving the setting screws of the other displacement mechanisms in rotation through that setting screw.

6. A control device according to claim 5, wherein said rotary drive means comprises a motor.

7. A control device according to claim 1, wherein said rotation transmitting means comprises an input driving member rotatably driven by the corresponding setting screw and displaceable longitudinally thereof, and an output driving member rotatably driven through said input driving member, said output driving member rotatably driving the setting screw of the next displacement mechanism in succession.

8. A control device according to claim 7, wherein said input driving member has a wedge engaged in a longitudinal keyway of the corresponding setting screw, said wedge non-rotatably coupling said input driving member to the corresponding setting screw and being displaceable longitudinally of said keyway, and wherein said output driving member is fixedly connected to the setting screw of the next displacement mechanism in succession.

9. A control device according to claim 8, wherein said input and output driving members are gear wheels.

10. In a Venetian blind production machine having a plurality of punching tool units disposed along the length of a machine bed for punching a length of slat material, a control device for proportionally adjusting the positions of the punching tool units along the machine bed length in order to enable production of blinds of different slat lengths, said control device comprising:

a plurality of punching tool unit displacement mechanisms arranged in succession along the machine bed length, each displacement mechanism including a gear unit and a corresponding setting screw, each gear unit having means responsive to rotation of the corresponding setting screw for displacing that gear unit along the machine bed length and being connected to an associated punching tool unit for displacement of that punching tool unit therewith along the machine bed length, the gear unit of each displacement mechanism prior to the last in succession having means for transmitting rotation of the corresponding setting screw to the setting screw of the next displacement mechanism in succession, said rotation responsive means and said rotation transmitting means being constructed such that the gear units are proportionally displaced along the machine bed length in response to rotation of the setting screws.

11. A control device according to claim 10, wherein said rotation responsive means comprises a nut fixed to a housing of the respective gear unit and threadably engaged with the corresponding setting screw.

12. A control device according to claim 10, wherein said rotation transmitting means comprises an input driving member having a wedge engaged in a longitudinal keyway of the corresponding setting screw, said wedge non-rotatably coupling said input driving member to the corresponding setting screw and being displaceable longitudinally of said keyway, and an output driving member driven through said input driving member and fixedly connected to the setting screw of the next displacement mechanism in succession.

13. In a machine having a plurality of tool units arranged in succession along the length of a machine bed, a control device for proportionally adjusting the positions of the tool units along the machine bed length, said control device comprising:

a plurality of tool unit displacement mechanisms arranged in succession along the machine bed length, each displacement mechanism including a setting screw and means displaceable along the machine bed length in response to rotation of the setting screw, said displaceable means being connected to an associated tool unit for displacement of that tool unit therewith along the machine bed length, each displacement mechanism prior to the last in succession having means for transmitting rotation of its setting screw to the setting screw of the next displacement mechanism in succession such that all of the setting screws are connected in series for joint operation by a rotary drive means connected to one of the setting screws, the respective displaceable means and rotation transmitting means of the displacement mechanisms being constructed such that the displaceable means are proportionally displaced along the machine bed length in response to rotation of the setting screws.

14. A control device according to claim 13, wherein each said displaceable means comprises a nut threadably engaged with the corresponding setting screw, and each said rotation transmitting means comprises an input gear wheel driven through the corresponding setting screw and an output gear wheel driven through said input gear wheel and driving the setting screw of the next displacement mechanism in succession.

15. A control device according to claim 14, wherein said input gear wheel is mounted for displacement along the machine bed with the corresponding displaceable means, with said input gear wheel being non-rotatably coupled to the corresponding setting screw by a wedge engaged in a longitudinal keyway of that setting screw and said wedge being displaceable longitudinally of said keyway, and wherein said output gear wheel is fixedly connected to the setting screw of the next displacement mechanism in succession.

* * * * *